UNITED STATES PATENT OFFICE.

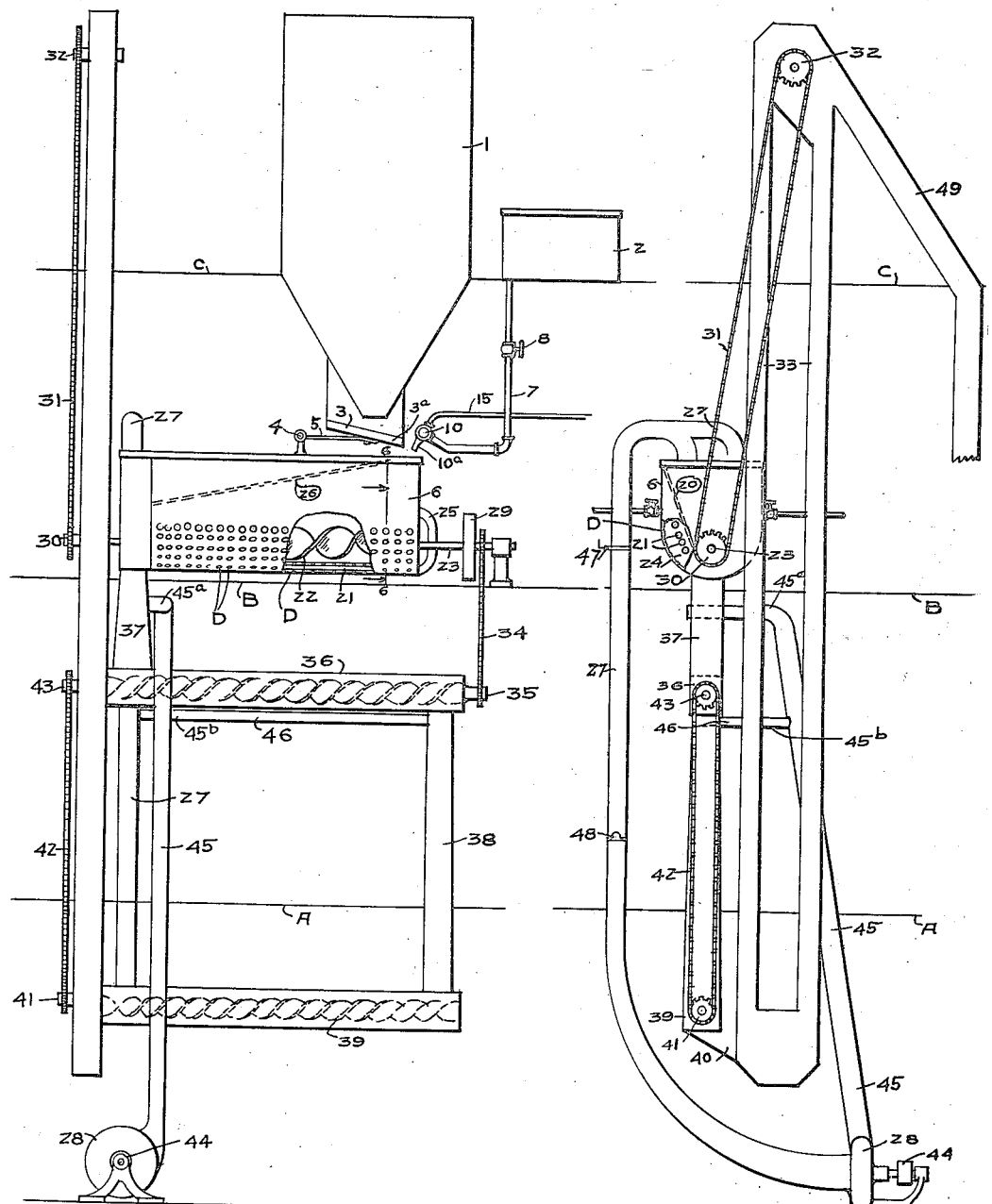

JOSEPH E. J. GOODLETT, OF MEMPHIS, TENNESSEE, ASSIGNOR TO H. J. FORSDICK AND P. McINTYRE, OF MEMPHIS, TENNESSEE.

PROCESS OF MAKING OR MIXING STOCK FOODS.

1,005,536.

Specification of Letters Patent.  Patented Oct. 10, 1911.

Original application filed October 28, 1909, Serial No 525,021. Divided and this application filed November 30, 1910. Serial No. 594,995.

*To all whom it may concern:*

Be it known that I, JOSEPH E. J. GOODLETT, a citizen of the United States, residing at Memphis, in the county of Shelby and State of Tennessee, have invented certain new and useful Improvements in Process of Making or Mixing Stock Foods, of which the following is a specification.

My invention relates to an improved process of treating stock-foods, or more specifically stated, an improved process or method of impregnating stock-foods or dry base material with molasses.

Generally speaking, the process consists in heating, atomizing, and projecting molasses into a thin falling stream of stock-food or dry base material whereby the latter becomes thoroughly impregnated with the former; then heating, stirring, and conveying the impregnated material; and then finally, gradually drying the material and reducing the temperature thereof by means of suitable conveyers and cool suction air blasts, the latter being carried over the material as the same is passed through said conveyers.

In the accompanying drawings I have shown a convenient apparatus for carrying out the process herein described and claimed. This apparatus is made the subject of my application for Letters Patent for improvements in machines for impregnating stock-foods, filed October 28, 1909, Serial No. 525,021, of which this application is a divisional part.

Figure 3:
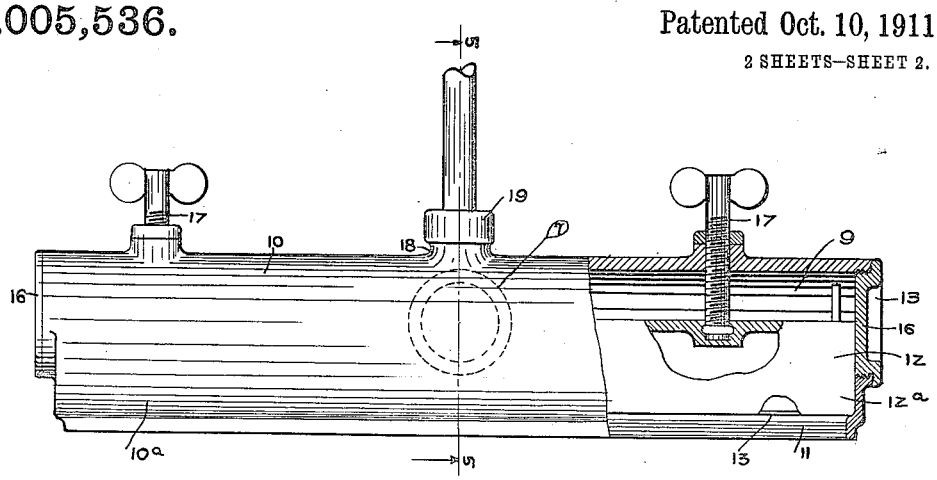
Figure 4:
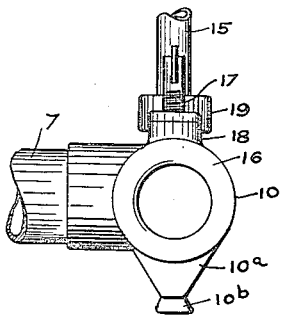
Figure 5:
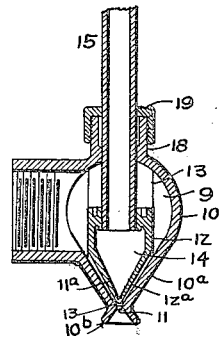
Figure 6:
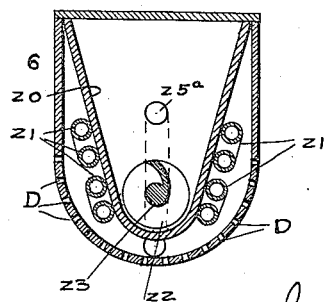

Referring to the accompanying drawings forming a part of this specification, Figure 1 is a front elevation of a machine or apparatus for carrying out my improved process. Fig. 2, an end elevation of the same. Fig. 3, an enlarged detailed top plan view of the improved atomizing nozzle, a portion of its walls being broken away for the purpose of clearer illustration of the parts. Fig. 4, an end view of the same. Fig. 5, a cross sectional view of the same taken through line 5—5 of Fig. 3. Fig. 6, a cross sectional view of the heater-mixer taken through line 6—6 of Fig. 1.

Similar numerals of reference designate like parts throughout all the figures of the drawings.

The improved machine or apparatus, in its present embodiment comprises a storage bin 1, into which the stock-food or dry base material to be treated is first placed, and a molasses heating kettle or tank 2, to receive the molasses to be heated and atomized as hereinafter described. The storage bin 1, is provided with a depending hopper portion 1ª, provided at its lower end with an inclined shaker board or plate 3, adapted when the machinery is operated, to be reciprocated by means of an eccentric shaft 4, and connecting rod 5. When the machinery is in operation the shaker plate 3, is adapted to distribute and feed the stock-food or base material in a thin longitudinally extending stream along the edge 3ª, of the plate where it falls into one end of the heater-mixer 6, to be heated and conveyed as hereinafter described.

After the molasses has been properly heated in the kettle or tank 2, preferably at a temperature of from 210° to 220° Fahrenheit and the machinery started, it is conducted through the conduit pipe 7, by opening the valve 8, and the hot molasses is permitted to enter the longitudinally extending chamber 9, of the valve body 10, carried upon the end of the conduit pipe 7. The valve body 10, extends horizontally the full width of the adjacent end of the heater-mixer 6, and is provided with longitudinally extending nozzle portion 10ª, adjacent to the falling stream of food to be treated, and said nozzle portion is adapted to distribute and project the atomized molasses into the falling stream of stock-food or base material.

The character and quantity of the atomized stream of molasses passing out of the longitudinal slot 11, of the nipple portion 10ᵇ, is controlled and regulated by means of a longitudinally extending hollow wedge shaped or tapered movable valve 12, mounted in ways 13, within the valve body 10, said movable valve having its tapered portion 12ª, adapted to be seated within the longitudinal recess or channel portion 11ª, of the valve body. The movable valve 12, is provided with a longitudinal slot 13, at the apex of its tapered portion 12ª; said slot registering with and being adjacent to the longitudinal slot 11, in the nozzle portion of the valve body and communicating with a longitudinally extending air chamber 14, within the movable valve. The movable valve 12, is provided at its rear with an air inlet pipe stem 15, extending through and slidably mounted in the rear portion of the valve body. The air inlet pipe or stem 15, is connected to a suitable air pipe or hose communicating with a suitable air compressor adapted to force compressed air into air chamber 14, and out through the longitudinal slot 13, whereby the hot molasses in passing out through the longitudinal slot 11, of the nozzle portion of the valve body will be thoroughly atomized and projected into the adjacent falling stream of stock-food.

The valve body 10 is provided at its ends with threaded openings through which the movable valve 12, may be inserted or removed, said threaded openings being closed by means of threaded plugs 16. The movable valve 12 is adapted to be moved or shifted to and from its open or closed positions by means of threaded thumb bolts 17, extending rearwardly and mounted in suitable threaded openings in the rear portion of the valve body as shown. The slidably mounted air inlet pipe 15, preferably extends through an exteriorly threaded boss 18, adapted to contain a packing-gland retained in position by means of a packing nut 19.

The heater-mixer 6, contains a V-shaped trough 20, surrounded by a series of steam heating pipes 21. The stock-food or base material after being subjected to the spray of molasses and after falling into the end of the heater-mixer, is carried along in the V-shaped trough by means of a screw conveyer 22, mounted on a driving shaft 23. The stock-food or base material, as carried along in the trough 20, is heated from the steam pipes 21, and the heat generated in the chamber 24, intermediate the trough 20, and the walls of the mixer 6, is adapted to communicate with the receiving end of conveyer trough 20, in the present instance, by means of a conduit pipe 25, having its end 25ª intersecting the front wall of the heater-mixer as shown most clearly in Fig. 6 of the drawings. An apron 26, is preferably formed in the trough 20, above the screw conveyer 22, and the hot air is drawn from the receiving end of the heater-mixer through the stream of falling base material toward the discharge end of the heater-mixer by means of a suction trunk 27, communicating with a suction or blower fan in the fan casing 28. The cold air passes into the heater-mixer 6, through the air inlet openings D and is there heated by passing over and about the steam pipes 21, where it is heated and utilized as above described. One end of the shaft 23, is provided with a driving pulley 29, adapted to carry a belting communicating with a suitable source of power and the other end of the driving shaft is provided with a sprocket wheel 30, carrying a sprocket chain 31, passing over a second sprocket wheel 32, above, which latter operates a suitable elevator chain or belt in the vertically arranged elevator boots 33. The shaft 23 is provided with a second sprocket wheel adjacent the driving pulley 29, carrying a second sprocket chain 34, passing over a sprocket wheel 35, below. The sprocket wheel 35, drives a second screw conveyer located in a conveyer box 36. The receiving end of the conveyer box 36, is provided with a vertical feed box or spout 37, which receives the feed from the discharge end of the heater-mixer 6, above. The feed, as received at the receiving end of the conveyer box 36, is carried by the screw conveyer to the opposite end of the conveyer box where it is discharged and falls through a vertical spout or box 38, into the receiving end of a second conveyer box 39. The feed as discharged in this conveyer box is conveyed by a screw conveyer, similar to those above described, to the opposite end of the conveyer box 39, where it is discharged through a discharge spout 40, intersecting the lower ends of the elevator boots 33. The screw conveyer in the conveyer box 39, is operated by a sprocket wheel 41, carrying a sprocket chain 42, passing over a sprocket wheel 43, on the end of the screw conveyer in the conveyer box above.

The fan in the fan casing 28, is adapted to be driven by a pulley 44, and to discharge cold air through an upwardly extending air discharge pipe 45, said air discharge pipe terminating at its upper end in outlet branches 45ª and 45ᵇ, the upper branch 45ª, intersecting the spout 37 and discharging cold air therein. The lower outlet branch 45ᵇ, intersects a cold air conduit 46, extending along the spout or box 36, and intersecting the upper end of the discharge spout or box 38.

The suction of the air in the suction trunk 27, may be regulated by means of a suction regulator slide valve 47, at the upper end of the suction trunk and a small cold air inlet opening 48, is provided below to admit a certain amount of cold air into the suction trunk 27, to mix with the warm air therein and carried to the fan in the fan casing below. The finished feed after being carried to the head of the elevator boots 33, above is discharged through the discharge pipe 49, leading to the sacker. The floor lines are indicated by the lines A, B, and C. The eccentric shaft 4 is suitably connected by means of any suitable and convenient gearing or driving mechanism to the driving shaft 23, carrying the main driving pulley 29.

As the stock-food is fed in a thin longitudinally extending stream along the edge 3ª, of the inclined shaker-board 3, and falls into the end of the heater-mixer 6, it is impregnated with hot atomized molasses projected into the falling stream by means of the longitudinally extending atomizing nozzle portion 10ª, of the valve body 10. A hot-air blast passes through the falling stream of stock-food from the conduit pipe 25, and the stock-food in the heater-mixer 6, is further heated by the passage of said hot-air over the stock-food and the heating of the walls of the V-shaped trough 20, by means of the steam heating pipes 21. When the stock-food reaches the discharge end of the heater-mixer 6, it is discharged vertically through a vertical spout 37, into the receiving end of a conveyer-box 36, below, and as the food falls through the spout 37, it is cooled to a certain degree by means of a cold air blast passing out of the branch 45ª, of the cold air discharge pipe 45, leading from the fan casing 28.

The stock-food is conveyed to the opposite end of the conveyer-box 36, by means of a second screw conveyer, and when it reaches the opposite or discharge end of the conveyer-box 36, it falls vertically through the vertical spout 38, where it is further cooled by a second cold air blast passing out of the intersecting cold air conduit 46, extending along the conveyer-box 36. By the time the stock-food has reached the receiving end of the conveyer-box 39, it has been sufficiently cooled and is conveyed through the conveyer-box by means of a third screw conveyer which discharges the stock-food into the intersecting lower ends of the elevator-boots 33.

From the foregoing description taken in connection with the accompanying drawings, the operation and advantages of my invention will be readily understood.

Having thus described my improved process and a means for carrying the same into effect, what I claim and desire to secure by Letters Patent is,—

1. The process of making or mixing stock-foods, consisting in simultaneously projecting intersecting streams of base material and hot atomized molasses, the former being in the form of a falling stream intersected by the latter.

2. The process of making or mixing stock-foods, consisting in (1) impregnating dry base material with hot atomized molasses, (2) stirring and heating said impregnated material, and (3) conveying drying and cooling the same by air blasts.

3. The process of making or mixing stock-foods, consisting in (1) projecting atomized heated molasses into a falling stream of base material, (2) gradually heating, and (3) gradually cooling the impregnated material in a stream subjected to air blasts.

4. The process of making or mixing stock-foods, consisting in (1) heating molasses and atomizing and projecting the same into a falling stream of base material, (2) heating and stirring the impregnated base material, and (3) drying and stirring the same in suction air blasts of reduced temperature.

5. The process of making or mixing stock-foods, consisting in (1) heating, atomizing, and projecting molasses into a falling stream of dry base material, (2) heating, stirring and conveying the material, and (3) drying said material and reducing the temperature thereof subjecting to the action of air blasts.

6. The process of making or mixing stock-foods, consisting in (1) feeding dry base material in a thin longitudinally-extending stream and projecting atomized heated molasses into said falling stream, (2) heating and conveying the material in the form of an agitated stream, and (3) drying and reducing the temperature of said material by conveying and agitating the same into a stream subjected to the action of suction-fan air blasts.

7. The process of making or mixing stock-foods, consisting in (1) projecting intersecting streams of base material and atomized molasses whereby the former becomes thoroughly impregnated with the latter, (2) heating and mixing the impregnated material and simultaneously subjecting the same to the action of warm air blasts, and (3) gradually cooling the same in the form of falling streams subjected to the action of cold air blasts.

In testimony whereof I have affixed my signature in presence of two witnesses.

JOSEPH E. J. GOODLETT.

Witnesses:
   B. G. POWELL,
   T. R. WINFIELD.